(12) United States Patent
Iida et al.

(10) Patent No.: US 10,933,811 B2
(45) Date of Patent: Mar. 2, 2021

(54) IMAGE DISPLAY APPARATUS

(71) Applicant: TOYOTA JIDOSHA KABUSHIKI KAISHA, Toyota (JP)

(72) Inventors: Tomoaki Iida, Okazaki (JP); Susumu Otsuka, Handa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 16/150,853

(22) Filed: Oct. 3, 2018

(65) Prior Publication Data
US 2019/0100148 A1 Apr. 4, 2019

(30) Foreign Application Priority Data

Oct. 4, 2017 (JP) .............................. JP2017-194309

(51) Int. Cl.
| | |
|---|---|
| *B60R 1/12* | (2006.01) |
| *H04N 5/232* | (2006.01) |
| *H04N 5/225* | (2006.01) |
| *B60R 1/066* | (2006.01) |
| *B60R 1/072* | (2006.01) |
| *B60R 11/04* | (2006.01) |

(52) U.S. Cl.
CPC ................ *B60R 1/12* (2013.01); *B60R 1/066* (2013.01); *B60R 1/072* (2013.01); *B60R 11/04* (2013.01); *H04N 5/2252* (2013.01); *H04N 5/23248* (2013.01); *B60R 2001/1253* (2013.01); *B60R 2300/101* (2013.01); *B60R 2300/60* (2013.01)

(58) Field of Classification Search
CPC ........... B60R 1/12; B60R 1/066; B60R 1/072; B60R 11/04; B60R 2001/1253; B60R 2001/101; B60R 2001/60; H04N 5/2252; H04N 5/23248
See application file for complete search history.

(56) References Cited

U.S. PATENT DOCUMENTS

| | | | | |
|---|---|---|---|---|
| 10,097,759 | B1* | 10/2018 | Motta | ................ H04N 5/23267 |
| 2002/0039136 | A1* | 4/2002 | Okamoto | .................. B60R 1/00 348/148 |
| 2004/0121820 | A1* | 6/2004 | Unno | ........................ B60R 1/06 455/569.2 |
| 2004/0189831 | A1* | 9/2004 | Shibatani | ............... H04N 5/232 348/240.99 |
| 2004/0196368 | A1 | 10/2004 | Asai | |
| 2007/0126564 | A1* | 6/2007 | Lee | ........................ B60Q 9/005 340/435 |

(Continued)

FOREIGN PATENT DOCUMENTS

| | | |
|---|---|---|
| JP | 6-75900 U | 10/1994 |
| JP | 2004-306670 A | 11/2004 |

(Continued)

*Primary Examiner* — Michael E Teitelbaum
(74) *Attorney, Agent, or Firm* — Sughrue Mion, PLLC

(57) ABSTRACT

An image display apparatus has: an imaging device (11L, 11R) that is placed at a tiltable housing (15L, 15R) and that is configured to image a rear side area (BL_area, BR_area) of a vehicle (1), the housing being allowed to rotate around a predetermined rotational axis ($\theta L, \theta R$) that is along a direction inclined to a yaw axis of the vehicle; and a displaying device (14) that is configured to display an external image captured by the imaging device.

6 Claims, 11 Drawing Sheets

(56) References Cited

U.S. PATENT DOCUMENTS

2013/0218398 A1   8/2013  Gandhi et al.
2017/0210297 A1*  7/2017  Kim .......................... B60R 1/12

FOREIGN PATENT DOCUMENTS

| JP | 2005-136561 A | 5/2005 |
| JP | 2013-001298 A | 1/2013 |
| JP | 2013-141904 A | 7/2013 |
| JP | 2017-39377 A  | 2/2017 |
| KR | 101683575 B1  | 12/2016 |

* cited by examiner

IMAGE DISPLAY APPARATUS

TECHNICAL FIELD

The present invention relates to a technical field of an image display apparatus that is configured to display, to an occupant of a vehicle, an image of an external circumstance of the vehicle that is captured by a camera placed at a tiltable housing, for example.

BACKGROUND ART

A Patent Literature 1 discloses one example of an image display apparatus. Specifically, the Patent Literature 1 discloses a monitoring apparatus for a vehicle that is configured to monitor a surrounding of the vehicle by displaying an image that is captured (in other words, imaged) by a camera placed at a door mirror of the vehicle.

Note that there are a Patent Literature 2 and a Patent Literature 3 as other documents relating to the present invention.

CITATION LIST

Patent Literature

[Patent Literature 1] Japanese Unexamined Patent Application Publication No. 2013-001298
[Patent Literature 2] Japanese Unexamined Patent Application Publication No. 2004-306670
[Patent Literature 3] Japanese Unexamined Patent Application Publication No. 2005-136561

SUMMARY OF INVENTION

Technical Problem

The camera placed at the door mirror (namely, the camera located at a door) is usually used as a substitute (in other words, an alternative) of the door mirror. Namely, the camera placed at the door is usually used as an electronic mirror. In this case, the camera is configured to image (in other words, capture an image of) an area including a rear side area of the vehicle (namely, a desired area that is expected to be imaged by the camera).

An external force (in other words, an external impact or shock) may be sometimes applied to the door mirror. Thus, the vehicle usually uses a tiltable door mirror that is allowed to be tilted to parry the external force. The tiltable door mirror is usually tilted by rotating around a rotational axis along a yaw axis of the vehicle. If the door mirror is tilted, a direction of the camera (for example, a direction of an optical axis of the camera) that is placed at the door mirror is also changed depending on a movement of the door mirror. Here, if the door mirror is tilted toward the rear side in order to parry the external force applied from the front side, the camera faces a body of the vehicle. As a result, the display displays the image that shows the body of the vehicle relatively largely. In this case, even if an occupant of the vehicle does not become aware that the door mirror is tilted, there is less possibility that the occupant misunderstands that the image displayed on the display is the image showing the desired area that is expected to be imaged by the camera. On the other hand, if the door mirror is tilted toward the front side in order to parry the external force applied from the rear side, the camera faces an area on the right side or the left side viewed from the vehicle. As a result, the display displays the image that shows the area on the right side or the left side viewed from the vehicle. In this case, there is a possibility that the occupant of the vehicle who does not become aware that the door mirror is tilted misunderstands that the image displayed on the display is the image showing the desired area that is expected to be imaged by the camera. This is because the occupant of the vehicle is more likely not to able to easily distinguish the image of the rear side area that is expected to be imaged by the camera from the image of the area on the right side or the left side viewed from the vehicle at a first glance. As a result, there is a possibility that the occupant of the vehicle misunderstands the circumstance at the rear side area of the vehicle, if the door mirror is tilted.

Note that same technical problem generally occurs not only in the case where the camera is placed at the door mirror but also in the case where the camera is placed at a tiltable housing (note that the door mirror corresponds to one example of the housing). Moreover, same technical problem generally occurs not only in the case where the camera images the rear side area but also in the case where the camera images a front side area.

The above described technical problem is one example of the technical problem to be solved by the present invention. It is therefore an object of the present invention to provide, for example, an image display apparatus that is configured to display, on a displaying device, an image of an external circumstance of a vehicle that is captured by an imaging device placed at a tiltable housing and that is configured to prevent an occupant who watches the image displayed on the displaying device when the housing is tilted from misunderstanding a surrounding circumstance of the vehicle.

Solution to Problem

One aspect of an image display apparatus of the present invention is an image display apparatus having: an imaging device that is placed at a tiltable housing and that is configured to image a rear side area or a front side area of a vehicle, the housing being allowed to rotate around a predetermined rotational axis that is along a direction inclined to a yaw axis of the vehicle; and a displaying device that is configured to display an external image captured by the imaging device.

Another aspect of an image display apparatus of the present invention is an image display apparatus having: an imaging device that is placed at a tiltable housing so that the imaging device is allowed to image a rear side area or a front side area of a vehicle when the housing is in a first state; and a displaying device that is configured to display an external image captured by the imaging device, the displaying device being configured to execute an alert operation for showing that the housing is in a second state that is different from the first state, if the housing is tilted to be in the second state.

DESCRIPTION OF EMBODIMENTS

Hereinafter, with reference to drawings, embodiments of the image display apparatus of the present invention will be described. In the following description, vehicles to each of which respective one of the embodiments of the image display apparatus of the present invention is adapted will be described.

(1) Vehicle 1 in First Embodiment

Figure 1:
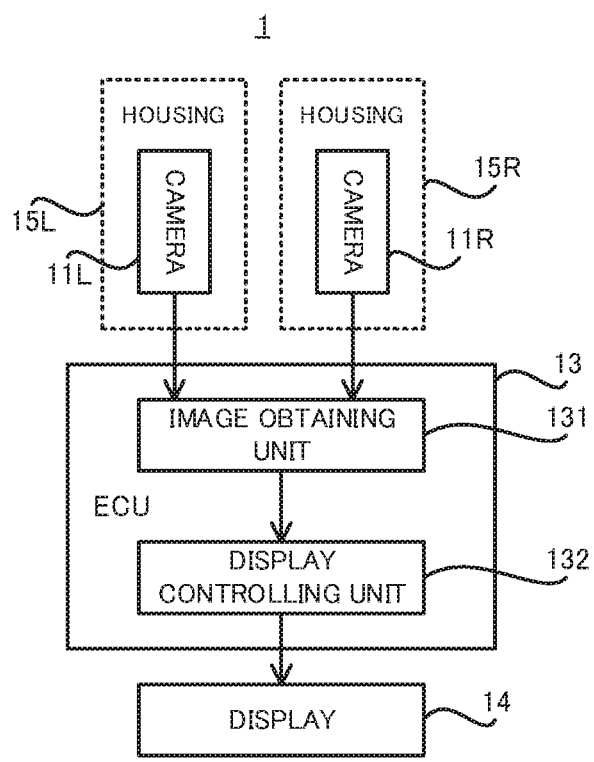
FIG. 1 is a block diagram that illustrates a structure of a vehicle in a first embodiment.
Figure 2:
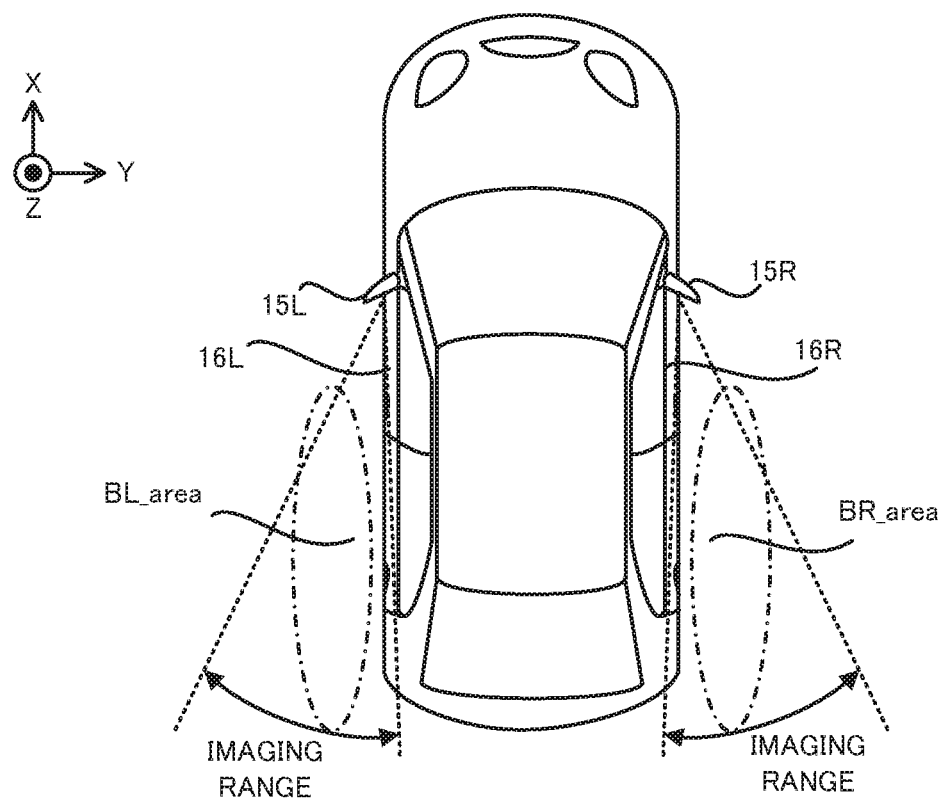
FIG. 2 is a planer view that illustrates positions at which a left camera and a right camera are placed, respectively, and an imaging range of each of the left camera and the right camera in the vehicle in the first embodiment.
Figure 3:
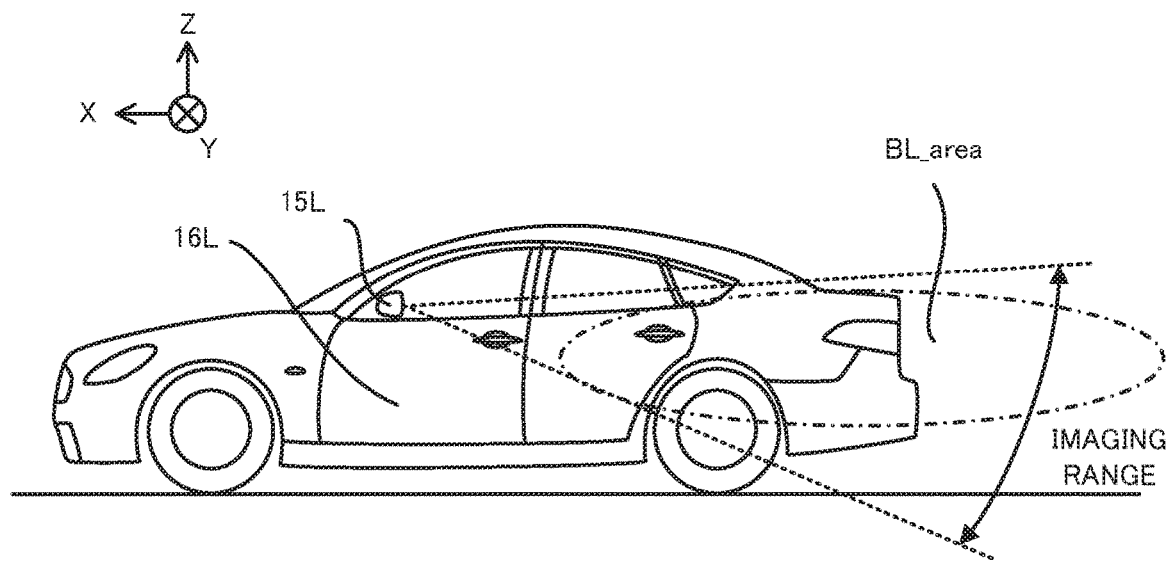
FIG. 3 is a side view that illustrates the position at which the left camera is placed and the imaging range of the left camera in the vehicle in the first embodiment.
Figure 4:
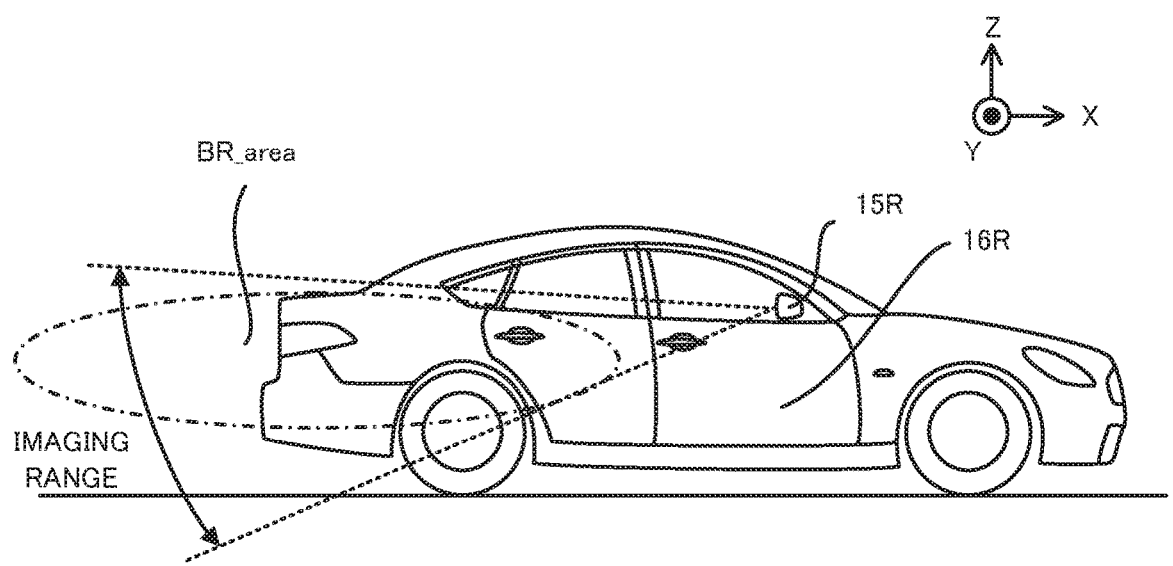
FIG. 4 is a side view that illustrates the position at which the right camera is placed and the imaging range of the right camera in the vehicle in the first embodiment.

Firstly, with reference to FIG. 1 to FIG. 4, a structure of the vehicle 1 in the first embodiment will be explained. FIG. 1 is a block diagram that illustrates the structure of the vehicle 1 in the first embodiment. FIG. 2 is a planer view that illustrates positions at which a left camera 11L and a right camera 11R are placed, respectively, and an imaging range of each of the left camera 11L and the right camera 11R in the vehicle 1 in the first embodiment. FIG. 3 is a side view that illustrates the position at which the left camera 11L is placed and the imaging range of the left camera 11L in the vehicle 1 in the first embodiment. FIG. 4 is a side view that illustrates the position at which the right camera 11R is placed and the imaging range of the right camera 11R in the vehicle 1 in the first embodiment.

As illustrated in FIG. 1, the vehicle 1 has: the left camera 11L that is one example of each of an "imaging device" and an "imager" in a below described additional statement; the right camera 11R that is one example of each of a "imaging device" and an "imager" in the below described additional statement; an ECU (Electronic Control Unit) 13; and a display 14 that is one example of a "displaying device" or a "display" in the below described additional statement.

The left camera 11L is placed (in other words, housed) at a camera housing 15L that protrudes toward the left side from a left door 16L of the vehicle 1, as illustrated in FIG. 2. The camera housing 15L is a structural object that has an appearance same as or similar to a housing for housing a door mirror and that is used to house the left camera 11L, for example.

The camera housing 15L is a tiltable housing. Specifically, if an external force is applied to the camera housing 15L from a front side (+X side in FIG. 2, the same applies to the below described description), the camera housing 15L is allowed to be tilted toward a rear side (−X side in FIG. 2, the same applies to the below described description) by rotating around a predetermined rotational axis θL to parry the external force. If the external force is applied to the camera housing 15L from the rear side, the camera housing 15L is allowed to be tilted toward the front side by rotating around the predetermined rotational axis θL to parry the external force.

The left camera 11L is configured to image (in other words, capture an image of) a left rear area BL_area of the vehicle 1 when the camera housing 15L at which the left camera 11L is placed is not tilted (hereinafter, this state is referred to as a "non-tilted state") (moreover, the left door 16L is in a closed state), as illustrated in FIG. 2 and FIG. 3. In other words, the left camera 11L and the camera housing 15L are aligned so that the left camera 11L is allowed to image the left rear area BL_area when the camera housing 15L is in the non-tilted state. The left rear area BL_area corresponds to an area that is reflected in a door mirror placed at the left door 16L when the left door 16L is in the closed state and the door mirror is not tilted, under the assumption that the door mirror is placed at the left door 16L. Namely, the left camera 11L is used as a substitute of the door mirror placed at the left door 16L and constitutes one portion of what we call an electronic mirror, in the first embodiment.

The right camera 11R is placed (in other words, housed) at a camera housing 15R that protrudes toward the right side from a right door 16R of the vehicle 1, as illustrated in FIG. 2. The camera housing 15R is a structural object that has an appearance same as or similar to a housing for housing a door mirror and that is used to house the right camera 11R, for example.

The camera housing 15R is a tiltable housing. Specifically, if an external force is applied to the camera housing 15R from the rear side, the camera housing 15R is allowed to be tilted toward the front side by rotating around a predetermined rotational axis θR to parry the external force. If the external force is applied to the camera housing 15R from the front side, the camera housing 15L is allowed to be tilted toward the rear side by rotating around the predetermined rotational axis θR to parry the external force.

The right camera 11R is configured to image (in other words, capture an image of) a right rear area BR_area of the vehicle 1 when the camera housing 15R at which the right camera 11R is placed is in the non-tilted state (moreover, the right door 16R is in a closed state), as illustrated in FIG. 2 and FIG. 4. In other words, the right camera 11R and the camera housing 15R are aligned so that the right camera 11R is allowed to image the right rear area BR_area when the camera housing 15R is in the non-tilted state. The right rear area BR_area corresponds to an area that is reflected in a door mirror placed at the right door 16R when the right door 16R is in the closed state and the door mirror is not tilted, under the assumption that the door mirror is placed at the right door 16R. Namely, the right camera 11R is used as a substitute of the door mirror placed at the right door 16R and constitutes one portion of what we call an electronic mirror, in the first embodiment.

The ECU 13 is configured to control entire operation of the vehicle 1. Especially in the first embodiment, the ECU 13 is configured to execute (in other word, perform) a display operation for displaying, on the display 14, the image captured by the left camera 11L (hereinafter, this image is referred to as a "left camera image") and the image captured by the right camera 11R (hereinafter, this image is referred to as a "right camera image"). In order to execute the display operation, the ECU 13 includes, as processing blocks that are logically realized in the ECU 13 or processing circuits that are physically realized in the ECU 13, an image obtaining unit 131 and a display controlling unit 132. The image obtaining unit 131 is configured to obtain the left camera image and the right camera image. The display controlling unit 132 is configured to control the display 14 to display the left camera image and the right camera image obtained by the image obtaining unit 131. Note that the display 14 is placed in a vehicle interior (in other words, a cabin) of the vehicle 1 and is configured to display the left camera image and the right camera image to an occupant (in other words, a person or a driver) of the vehicle 1 in the vehicle interior.

Figure 5:
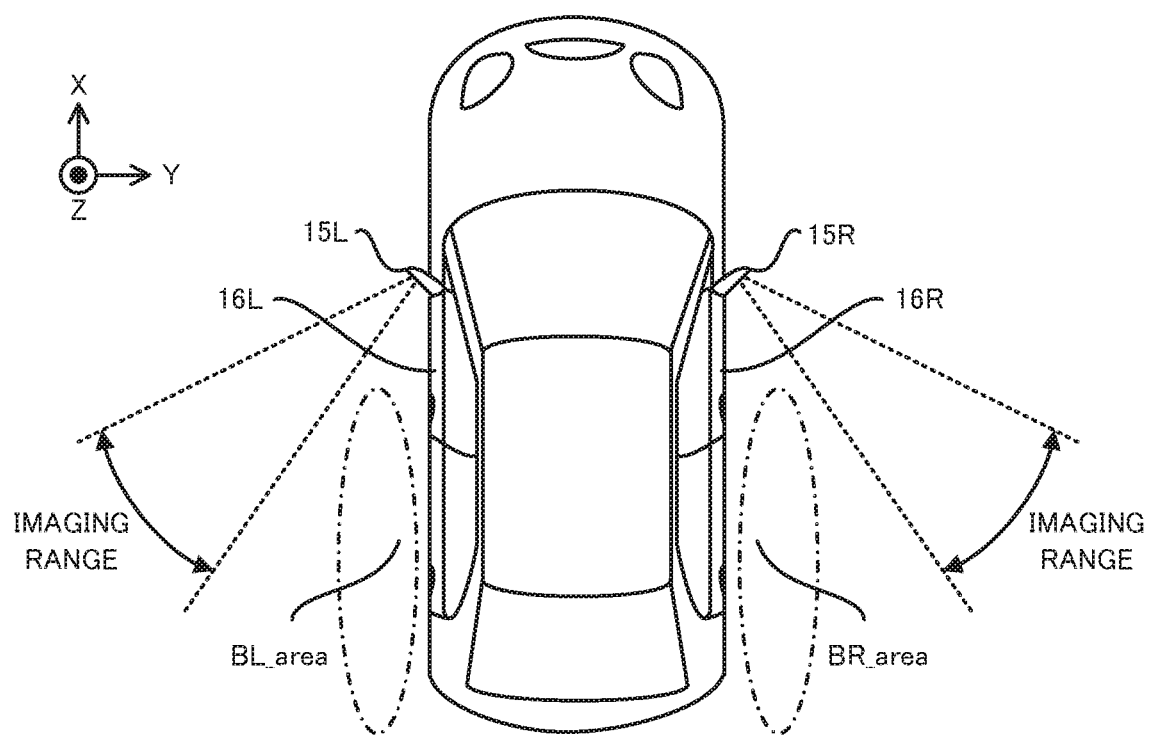
FIG. 5 is a planer view that illustrates the imaging range of each of the left camera and the right camera when a camera housing is in a tilted state.

Here, since the camera housing 15L is tiltable, a direction of the left camera 11L is changed depending on the tilting movement of the camera housing 15L. Thus, when the camera housing 15L is tilted (hereinafter, this state is referred to as a "tilted state"), the left camera 15L is not allowed to appropriately image the left rear area BL_area, as illustrated in FIG. 5. Thus, the left camera image is not the image showing the circumstance of the left rear area BL_area that is expected to be imaged by the left camera 11L. Namely, the left camera image is the image showing the circumstance of an undesired area that is not expected to be imaged by the left camera 11L. As a result, if the occupant of the vehicle 1 is more likely not to able to easily distinguish the left camera image captured when the camera housing 15L is in the non-tilted state from the left camera image captured when the camera housing 15L is in the tilted state at first glance, there is a possibility that the occupant who does not become aware that the camera housing 15L is in the tilted state does not become aware that the left camera image displayed on the display 14 is the image showing the circumstance of the undesired area that is not expected to be imaged by the left camera 11L. Namely, there is a possibility that the occupant misunderstands that the left camera image displayed on the display 14 is the image showing the circumstance of the left rear area BL_area, although the display 14 displays the left camera image showing the circumstance of the undesired area that is not expected to be imaged by the left camera 11L due to the camera housing 15L being in the tilted state. As a result, there is a possibility that the occupant misunderstands the circumstance of the left rear area BL_area of the vehicle 1. Furthermore, also in the case where even the camera housing 15R is in the tilted state, there is a possibility that the occupant misunderstands that the right camera image displayed on the display 14 is the image showing the circumstance of the right rear area BR_area for the same reason, although the display 14 displays the right camera image showing the circumstance of the undesired area that is not expected to be imaged by the right camera 11R due to the camera housing 15R being in the tilted state. As a result, there is a possibility that the occupant misunderstands the circumstance of the right rear area BR_area of the vehicle 1.

Figure 6A:
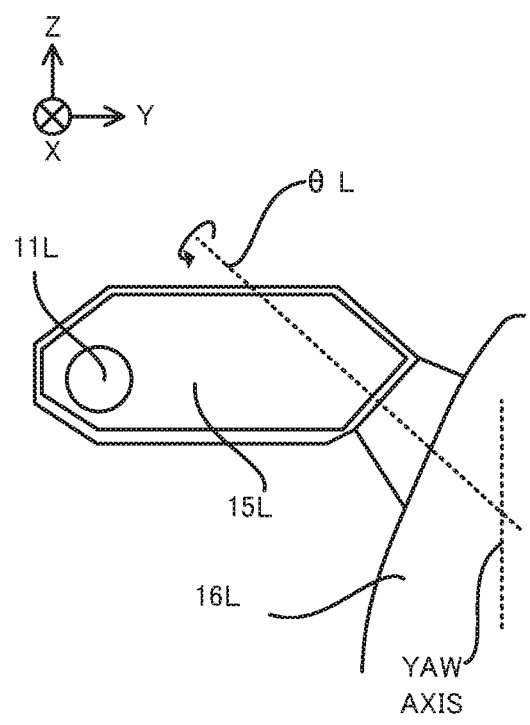
FIG. 6(a) illustrates the camera housing that is in a non-tilted state and FIG. 6(b) illustrates the camera housing that is in the tilted state.
Figure 6B:
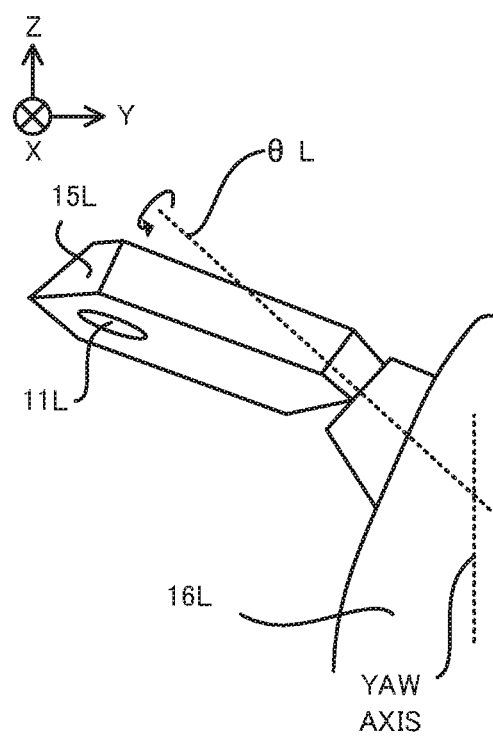

Thus, in the first embodiment, the rotational axis θL of the camera housing 15L is inclined to a yaw axis of the vehicle 1 (namely, a vertical axis and a Z axis) as illustrated in FIG. 6(a) and FIG. 6(b), in order to prevent the occupant who watches the left camera image displayed on the display 14 when the camera housing 15L is in the tilted state from misunderstanding the circumstance of the left rear area BL_area. Note that FIG. 6(a) illustrates the camera housing 15L in the non-tilted state and FIG. 6(b) illustrates the camera housing 15L in the tilted state.

Figure 7A:
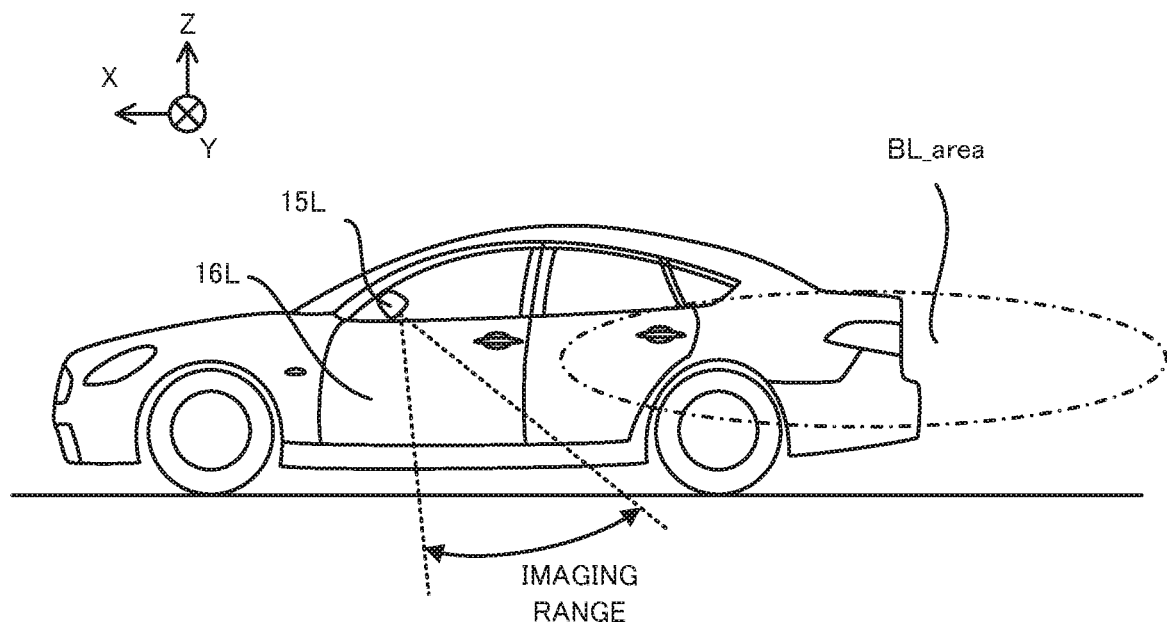
FIG. 7 Each of FIG. 7(a) to FIG. 7(b) is a side view that illustrates the imaging range of the left camera when the camera housing is in the tilted state.

As illustrated in FIG. 6(b), when the rotational axis θL of the camera housing 15L is inclined to the yaw axis of the vehicle 1, the state of the left camera 11L is changed from a state in which the left camera 11L faces the left rear area BL_area to a state in which the left camera 11L faces a ground (for example, a ground on the left side viewed from the vehicle 1) if the state of the camera housing 15L is changed from the non-tilted state to the tilted state. In this case, the camera housing 15L in the tilted state is tilted so that the imaging range of the left camera 11L does not include a border area corresponding to a horizon line (specifically, an area corresponding to at least one of a border between the ground and a sky and a border between the ground and a structural object on the ground). In other words, the left camera 11L and the camera housing 15L are aligned so that the left camera 11L is allowed to image the ground and is not allowed to image the border area when the camera housing 15L is in the tilted state. As a result, when the camera housing 15L is in the tilted state (moreover, the left door 16L is in the closed state), the left camera 11L images the ground and does not image the border area, as illustrated in FIG. 7(a).

Figure 7B:
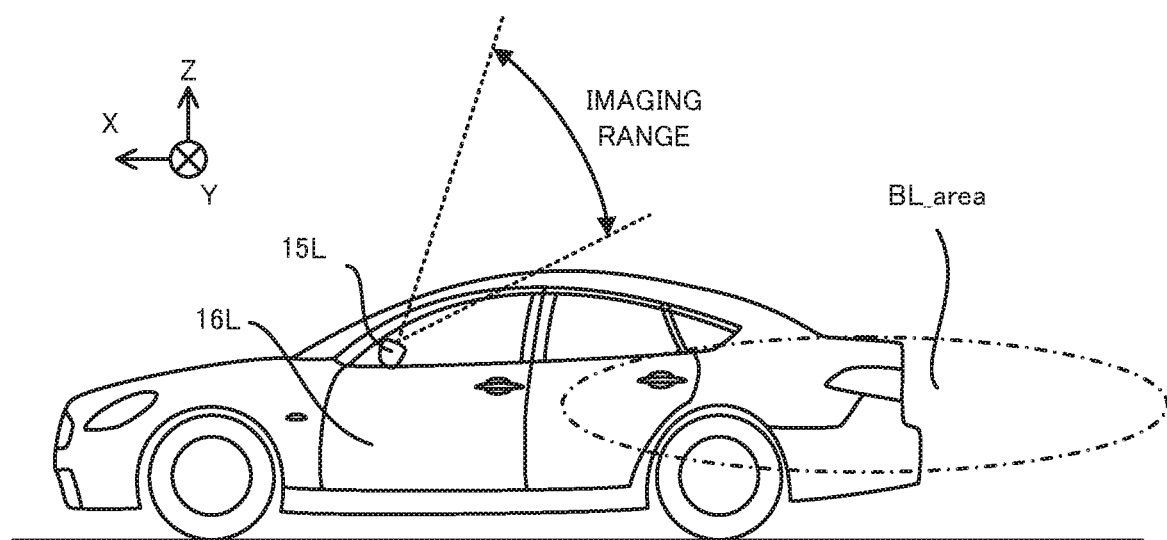

Alternatively, the state of the left camera 11L may be changed from the state in which the left camera 11L faces the left rear area BL_area to a state in which the left camera 11L faces a sky (for example, a sky on the left side and an upper side viewed from the vehicle 1) if the state of the camera housing 15L is changed from the non-tilted state to the tilted state, depending on a rotational direction of the camera housing 15L. Also in this case, the camera housing 15L in the tilted state is tilted so that the imaging range of the left camera 11L does not include the border area. As a result, when the camera housing 15L is in the tilted state (moreover, the left door 16L is in the closed state), the left camera 11L images the sky and does not image the border area, as illustrated in FIG. 7(b).

As a result, when the camera housing 15L is in the tilted state, the display 14 displays the left camera image showing the ground or the sky. Here, the occupant is able to distinguish the left camera image that is obtained by imaging the ground or the sky from the left camera image that is obtained by imaging the left rear area BL_area at first glance, relatively easily. Especially, the occupant is able to distinguish the left camera image that is obtained by imaging the ground or the sky from the left camera image that is obtained by imaging the left rear area BL_area at first glance more easily in the case where the left camera image obtained by imaging the ground or the sky does not include the border area, compared to the case where the left camera image obtained by imaging the ground or the sky includes the border area. This is because the left camera image that is obtained by imaging the left rear area BL_area usually includes the border area. As a result, even if the occupant does not become aware that the camera housing 15L is tilted, there is relatively high possibility that the occupant understands that the left camera image displayed on the display 14 is not the image showing the left rear area BL_area that is expected to be imaged by the left camera 11L. In other words, even if the occupant does not become aware that the camera housing 15L is tilted, there is less possibility that the occupant misunderstands that the left camera image displayed on the display 14 is the image showing the left rear area BL_area. Therefore, the vehicle 1 in the first embodiment is capable of preventing the occupant who watches the left camera image displayed on the display 14 when the camera housing 15L is tilted from misunderstanding the surrounding circumstance of the vehicle 1 (especially, the circumstance of the left rear area BL_area).

Figure 8A:
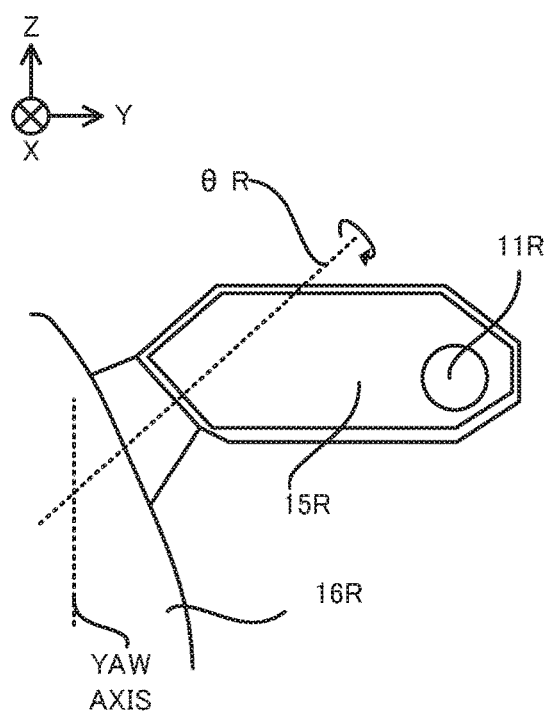
FIG. 8(a) illustrates the camera housing that is in the non-tilted state and FIG. 8(b) illustrates the camera housing that is in the tilted state.
Figure 8B:
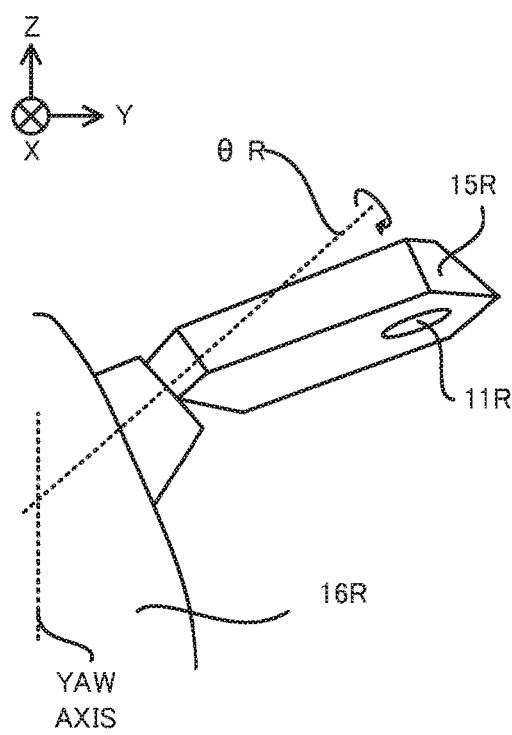

The same applies to the camera housing 15R. Thus, the rotational axis θR of the camera housing 15R is inclined to the yaw axis of the vehicle 1 as illustrated in FIG. 8(*a*) and FIG. 8(*b*), in order to prevent the occupant who watches the right camera image displayed on the display 14 when the camera housing 15R is in the tilted state from misunderstanding the circumstance of the right rear area BR_area. Note that FIG. 8(*a*) illustrates the camera housing 15R in the non-tilted state and FIG. 8(*b*) illustrates the camera housing 15R in the tilted state.

As illustrated in FIG. 8(*b*), when the rotational axis θR of the camera housing 15R is inclined to the yaw axis of the vehicle 1, the state of the right camera 11R is changed from a state in which the right camera 11R faces the right rear area BR_area to a state in which the right camera 11R faces the ground (for example, the ground on the right side viewed from the vehicle 1) or the sky (for example, a sky on the right side and the upper side viewed from the vehicle 1) if the state of the camera housing 15R is changed from the non-tilted state to the tilted state. In this case, the camera housing 15R in the tilted state is tilted so that the imaging range of the right camera 11R does not include the border area corresponding to the horizon line. In other words, the right camera 11R and the camera housing 15R are aligned so that the right camera 11R is allowed to image the ground (for example, the ground on the right side viewed from the vehicle 1) and is not allowed to image the border area (for example, the border area between the sky and the ground on the right side viewed from the vehicle 1) when the camera housing 15R is in the tilted state. As a result, when the camera housing 15R is in the tilted state (moreover, the right door 16R is in the closed state), the right camera 11R images the ground or the sky and does not image the border area, although it is not illustrated by the drawing for the purpose of simple illustration.

As a result, when the camera housing 15R is in the tilted state, the display 14 displays the right camera image showing the ground or the sky. Here, the occupant is able to distinguish the right camera image that is obtained by imaging the ground or the sky from the right camera image that is obtained by imaging the right rear area BR_area at first glance, relatively easily, as with the above described left camera image. As a result, even if the occupant does not become aware that the camera housing 15R is tilted, there is relatively high possibility that the occupant understands that the right camera image displayed on the display 14 is not the image showing the right rear area BR_area that is expected to be imaged by the right camera 11R. In other words, even if the occupant does not become aware that the camera housing 15R is tilted, there is less possibility that the occupant misunderstands that the right camera image displayed on the display 14 is the image showing the right rear area BR_area. Therefore, the vehicle 1 in the first embodiment is capable of preventing the occupant who watches the right camera image displayed on the display 14 when the camera housing 15R is tilted from misunderstanding the surrounding circumstance of the vehicle 1 (especially, the circumstance of the right rear area BR_area).

Note that the above described description uses an example in which the imaging range of the left camera 11L does not include the border area when the camera housing 15L is in the tilted state. However, the imaging range of the left camera 11L may include the border area when the camera housing 15L is in the tilted state. Even in this case, the fact remains that the occupant is able to distinguish the left camera image that is obtained by imaging the ground or the sky from the left camera image that is obtained by imaging the left rear area BL_area at first glance, relatively easily. Therefore, the fact remains that the vehicle 1 in the first embodiment is capable of preventing, to some degree, the occupant who watches the left camera image displayed on the display 14 when the camera housing 15L is tilted from misunderstanding the surrounding circumstance of the vehicle 1 (especially, the circumstance of the left rear area BL_area). For the same reason, the imaging range of the right camera 11R may include the border area when the camera housing 15R is in the tilted state.

Figure 9:
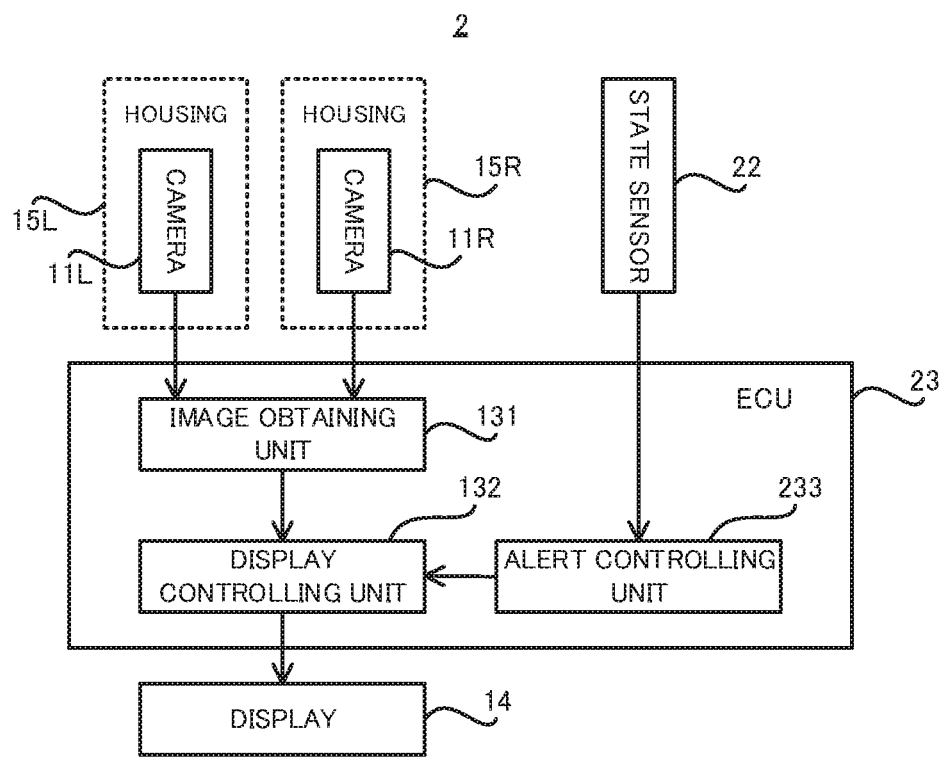
FIG. 9 is a block diagram that illustrates a structure of a vehicle in a second embodiment.

(2) Vehicle 2 in Second Embodiment (2-1) Structure of Vehicle 2 in Second Embodiment Next, with reference to FIG. 9, a structure of the vehicle 2 in the second embodiment will be explained. FIG. 9 is a block diagram that illustrates the structure of the vehicle 2 in the second embodiment. Note that the detailed description about the element that is same as the element of the vehicle 1 in the first embodiment is omitted by assigning same reference number to the element.

As illustrated in FIG. 9, the vehicle 2 in the second embodiment is different from the vehicle 1 in the first embodiment in that the vehicle 2 has a state sensor 22 that is one example of a "detecting device" or a "detector" in the below described additional statement. The state sensor 22 is configured to detect the state of each of the camera housing 15L and the camera housing 15R. Especially, the state sensor 22 is configured to detect whether or not each of the camera housing 15L and the camera housing 15R is in the tilted state. Moreover, the vehicle 2 in the second embodiment is different from the vehicle 1 in the first embodiment in that the vehicle 2 has an ECU 23 instead of the ECU 13. The ECU 23 is different from the ECU 13 in that the ECU 23 include, as processing block that is logically realized in the ECU 23 or processing circuit that is physically realized in the ECU 23, an alert controlling unit 233. Another element of the vehicle 2 in the second embodiment may be same as another element of the vehicle 1 in the first embodiment.

Also in the second embodiment, as with the first embodiment, the ECU 23 is configured to execute the display operation for displaying the left camera image and the right camera image on the display 14 by using the image obtaining unit 131 and the display controlling unit 132. Especially in the second embodiment, the alert controlling unit 233 is configured to control the display 14 to execute an alert operation for alerting the occupant that the camera housing 15L is in the tilted state when the camera housing 15L is in the tilted state during the display operation, on the basis of a detection result of the state sensor 22, in order to prevent the occupant who watches the left camera image displayed on the display 14 when the camera housing 15L is in the tilted state from misunderstanding the circumstance of the left rear area BL_area. Similarly, the alert controlling unit 233 is configured to control the display 14 to execute an alert operation for alerting the occupant that the camera housing 15R is in the tilted state when the camera housing 15R is in the tilted state during the display operation, on the basis of the detection result of the state sensor 22, in order to prevent the occupant who watches the right camera image displayed on the display 14 when the camera housing 15R is in the tilted state from misunderstanding the circumstance of the right rear area BR_area. Namely, the vehicle 2 in the second embodiment is different from the vehicle 1 in the first embodiment in that (i) the vehicle 2 mainly uses the control of the ECU 23 in order to prevent the occupant who watches the image displayed on the display 14 from misunderstanding the surrounding circumstance of the vehicle 2 and (ii) the vehicle 1 mainly uses the structure of the camera housings 15L and 15R (especially, the structure relating the tilting) in order to prevent the occupant who watches the image displayed on the display 14 from misunderstanding the surrounding circumstance of the vehicle 1. Thus, in the second embodiment, the rotational axis θL of the camera housing 15L may not be inclined to the yaw axis of the vehicle 1. Similarly, in the second embodiment, the rotational axis θR of the camera housing 15R may not be inclined to the yaw axis of the vehicle 1. However, at least one of the rotational axis θL and the rotational axis θR may be inclined to the yaw axis of the vehicle 1.

(2-2) Flow of Display Operation Executed by ECU 23

Figure 10:
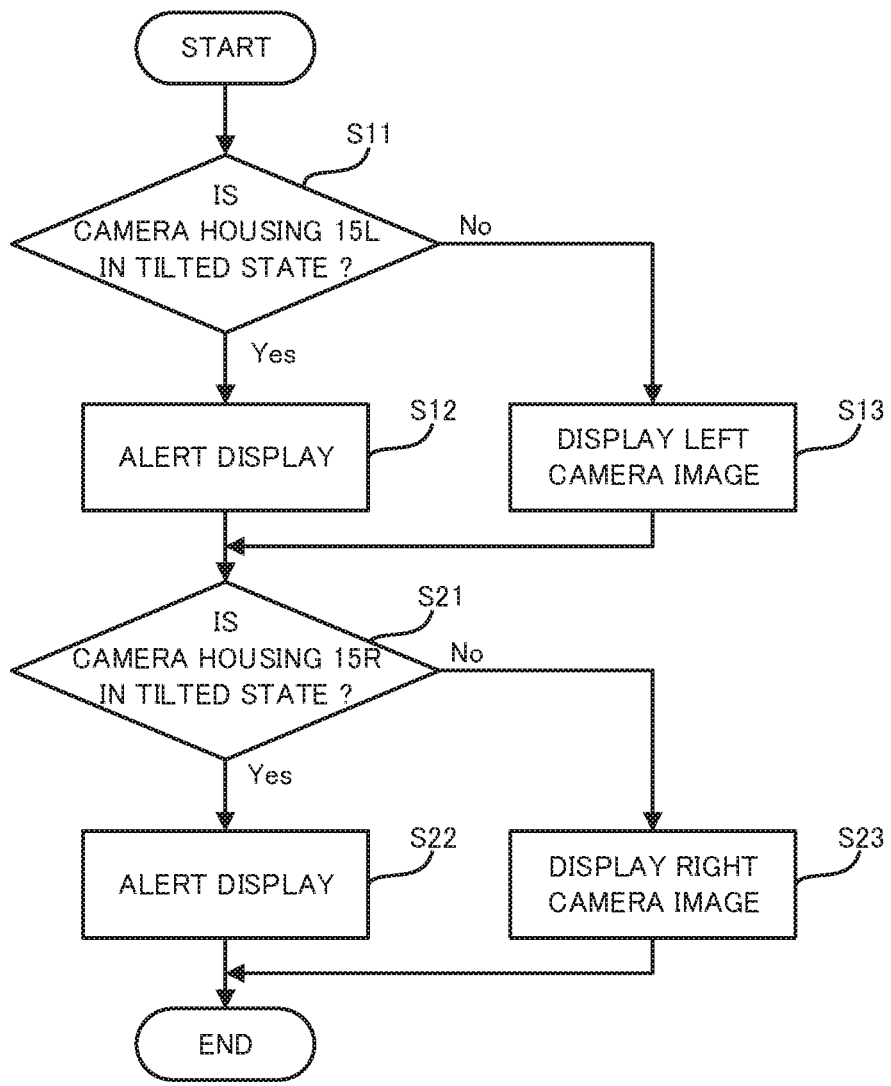
FIG. 10 is a flowchart that illustrates a flow of a display operation in the second embodiment.

Next, with reference to FIG. 10, a flow of the display operation in the second embodiment will be described. FIG. 10 is a flowchart that illustrates a flow of the display operation in the second embodiment.

As illustrated in FIG. 10, the alert controlling unit 233 determines on the basis of the detection result of the state sensor 22 whether or not the camera housing 15L is in the tilted state (a step S11). Note that the state sensor 22 may be any sensor as long as the state sensor 22 is capable of detecting the state of each of the camera housings 15L and 15R. For example, the state sensor 22 may be an angle sensor that is configured to detect a rotational angle of each of the camera housings 15L and 15R.

As a result of the determination at the step S11, if it is determined that the camera housing 15L is in the tilted state (the step S11: Yes), the alert controlling unit 233 controls the display controlling unit 132 to execute the alert operation (namely, the alert operation for alerting that the camera housing 15L is in the tilted state, the same applies to the description of the step S11 to a step S13) (a step S12).

The alert operation may be an operation for displaying an alert image for alerting that the camera housing 15L is in the tilted state while keeping displaying the left camera image. In this case, the display controlling unit 132 controls the display 14 to display the alert image with the left camera image. More specifically, the display controlling unit 132 controls the display 14 to display the alert image with the left camera image in a first display region that is at least one portion of a display screen of the display 14 and on which the left camera image should be displayed. As a result, the display 14 displays the alert image while keeping displaying the left camera image.

The alert operation may be an operation for displaying the alert image for alerting that the camera housing 15L is in the tilted state without displaying the left camera image. In this case, the display controlling unit 132 controls the display 14 to display the alert image and not to display the left camera image. More specifically, the display controlling unit 132 controls the display 14 to display the alert image and to hide (i.e. not to display) the left camera image in the first display region that is at least one portion of the display screen of the display 14 and on which the left camera image should be displayed. As a result, the display 14 displays the alert image without displaying the left camera image.

Figure 11:
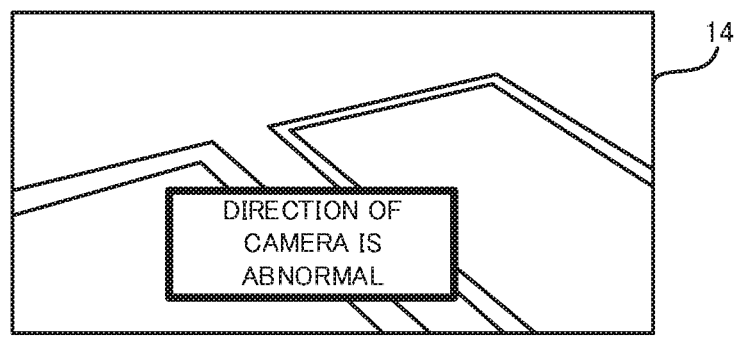
FIG. 11 is a planar view that illustrates one example of an alert image.

The alert image may be any image as long as the alert image is capable of visually alerting the occupant that the camera housing 15L is in the tilted state. For example, as illustrated in FIG. 11, the alert image may be an image including an alert message (an alert message including a text "the direction of the camera is abnormal" in an example illustrated in FIG. 11) for alerting that the camera housing 15L is in the tilted state. For example, the alert image may be an image including an alert icon for alerting that the camera housing 15L is in the tilted state. For example, the alert image may be an image including a decorated display for allowing the display aspect of the left camera image when the camera housing 15L is in the tilted state to be different from the display aspect of the left camera image when the camera housing 15L is in the non-tilted state.

Again in FIG. 10, on the other hand, as a result of the determination at the step S11, if it is determined that the camera housing 15L is not in the tilted state (namely, is in the non-tilted state) (the step S11: No), the alert controlling unit 233 does not control the display controlling unit 132 to execute the alert operation. Thus, the display controlling unit 132 controls the display 14 to display the left camera image and not to execute the alert operation (a step S13). As a result, the display 14 displays the left camera image without executing the alert operation (the step S13).

In parallel with, after or before the process from the step S11 to the step S13, the alert controlling unit 233 determines on the basis of the detection result of the state sensor 22 whether or not the camera housing 15R is in the tilted state (a step S21).

As a result of the determination at the step S21, if it is determined that the camera housing 15R is in the tilted state (the step S21: Yes), the alert controlling unit 233 controls the display controlling unit 132 to execute the alert operation (namely, the alert operation for alerting that the camera housing 15R is in the tilted state, the same applies to the description of the step S21 to a step S23) (a step S22). Note that the alert operation for alerting that the camera housing 15R is in the tilted state may be same as the alert operation for alerting that the camera housing 15L is in the tilted state.

On the other hand, as a result of the determination at the step S21, if it is determined that the camera housing 15R is not in the tilted state (namely, is in the non-tilted state) (the step S21: No), the alert controlling unit 233 does not control the display controlling unit 132 to execute the alert operation. Thus, the display controlling unit 132 controls the display 14 to display the right camera image and not to execute the alert operation (a step S23). As a result, the display 14 displays the right camera image without executing the alert operation (the step S23).

According to the above described second embodiment, if the camera hosing 15L is in the tilted state, the display 14 for displaying the left camera image executes the alert operation for alerting that the camera housing 15L is in the tilted state while displaying the left camera image. Especially, the alert image is displayed in the first display region on which the left camera image is displayed, and thus, there is less possibility that the occupant who watches the left camera image displayed on the display 14 passes over (in other words, miss) the alert image. Thus, the occupant is capable of understanding that the left camera image displayed on the display 14 is not the image showing the circumstance of the left rear area BL_area that is expected to be imaged by the left camera 11L. In other words, the occupant does not misunderstand that the left camera image displayed on the display 14 is the image showing the circumstance of the left rear area BL_area. Thus, the vehicle 2 in the second embodiment is capable of appropriately preventing the occupant who watches the left camera image displayed on the display 14 when the camera housing 15L is in the tilted state from misunderstanding the surrounding circumstance of the vehicle 1 (especially, the circumstance of the left rear area BL_area).

Alternatively, if the camera hosing 15L is in the tilted state, the display 14 for displaying the left camera image executes the alert operation for alerting that the camera housing 15L is in the tilted state without displaying the left camera image. In this case, the occupant does not misunderstand that the display 14 displays the image showing the circumstance of the left rear area BL_area when the camera housing 15L is in the tilted state, because the left camera image is not displayed on the display 14. Thus, it is possible to appropriately prevent the occupant from misunderstanding the surrounding circumstance of the vehicle 1 (especially, the circumstance of the left rear area BL_area) when the camera housing 15L is in the tilted state. Moreover, since the display 14 displays the alert image, the occupant appropriately understands that the camera housing 15L is in the tilted state without misunderstanding that the left camera image is not displayed due to a trouble of the display 14.

Although the detailed description relating to the camera housing 15R is omitted for the purpose of avoiding the redundant description, it is also possible to appropriately prevent the occupant from misunderstanding the surrounding circumstance of the vehicle 1 (especially, the circumstance of the right rear area BR_area) when the camera housing 15R is in the tilted state, for the same reason as the case where the camera housing 15L is in the tilted state.

(3) Modified Example

Figure 12:
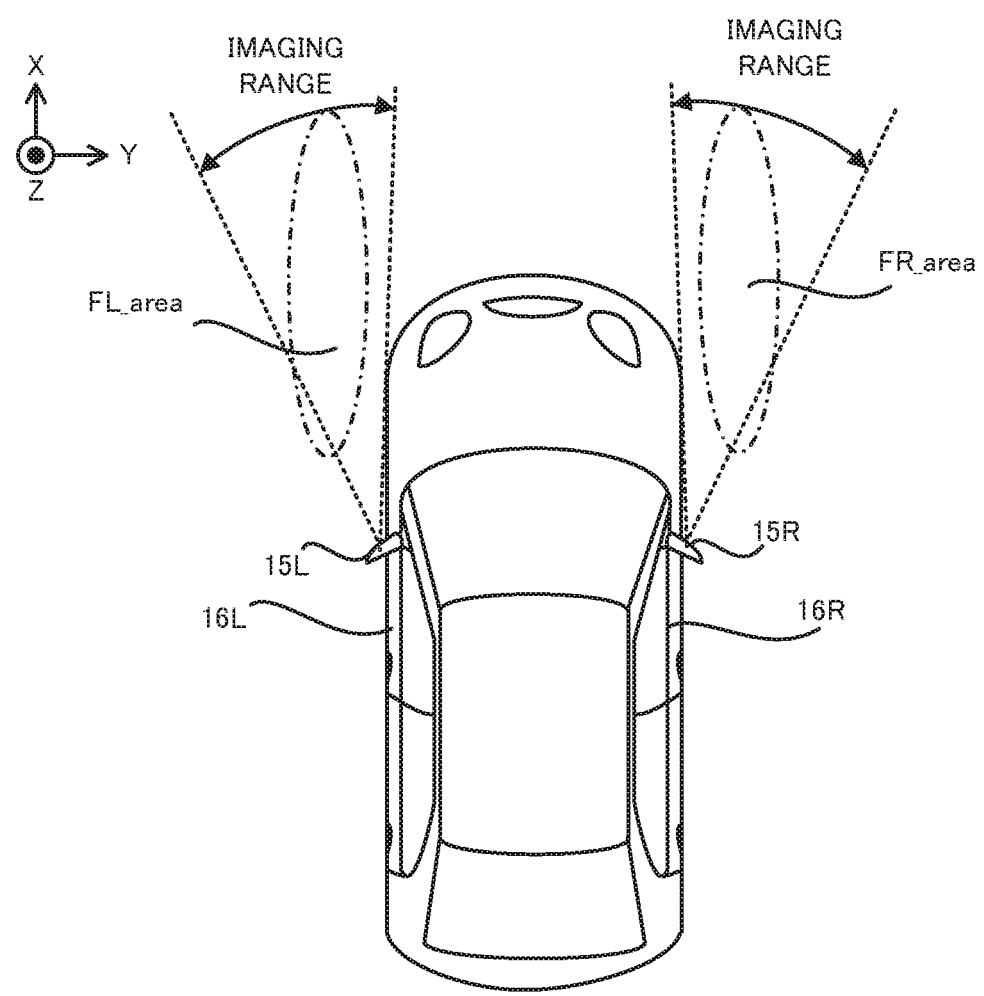
FIG. 12 is a planer view that illustrates a modified example of the imaging range of each of the left camera and the right camera.

The above described description uses an example in which the left camera 11L images the left rear area BL_area when the camera housing 15L is in the non-tilted state. However, as illustrated in FIG. 12, the left camera 11L may image a left front area FL_area of the vehicle 1 instead of or in addition to the left rear area BL_area when the camera housing 15L is in the non-tilted state. Namely, the left camera 11L may image the left front area FL_area that is located more anteriorly than the left rear area BL_area. Even in this case, it is possible to appropriately prevent the occupant from misunderstanding the circumstance of the left front area FL_area for the same reason as the case where it is possible to appropriately prevent the occupant from misunderstanding the circumstance of the left rear area BL_area.

Similarly, the above described description uses an example in which the right camera 11R images the right rear area BR_area when the camera housing 15R is in the non-tilted state. However, as illustrated in FIG. 12, the right camera 11R may image a right front area FR_area of the vehicle 1 instead of or in addition to the right rear area BR_area when the camera housing 15R is in the non-tilted state. Namely, the right camera 11R may image the right front area FR_area that is located more anteriorly than the right rear area BR_area. Even in this case, it is possible to appropriately prevent the occupant from misunderstanding the circumstance of the right front area FR_area for the same reason as the case where it is possible to appropriately prevent the occupant from misunderstanding the circumstance of the right rear area BR_area.

(5) Additional Statement

Relating to the above described embodiment, following additional statements will be disclosed.

(5-1) Additional Statement 1

An image display apparatus according to the additional statement 1 is an image display apparatus having: an imaging device that is placed at a tiltable housing and that is configured to image a rear side area or a front side area of a vehicle, the housing being allowed to rotate around a predetermined rotational axis that is along a direction inclined to a yaw axis of the vehicle; and a displaying device that is configured to display an external image captured by the imaging device.

Alternatively, an image display apparatus according to the additional statement 1 may be an image display apparatus having: an imager that is placed at a tiltable housing and that is configured to image a rear side area or a front side area of a vehicle, the housing being allowed to rotate around a predetermined rotational axis that is along a direction inclined to a yaw axis of the vehicle; and a display that is configured to display an external image captured by the imager.

In the image display apparatus according to the additional statement 1, if the housing rotates to be tilted by an external force or the like, a state of the imaging device (or the imager, the same applies to the below described description about the additional statement) is changed from a state in which the imaging device images the rear side area or the front side area that is expected to be imaged by the imaging device to a state in which the imaging device images an area that is outside the vehicle and that is different from the rear side area and the front side area. Here, especially in the additional statement 1, the rotational axis of the housing inclined to the yaw axis of the vehicle (namely, a vertical axis). Thus, the imaging device that has imaged the rear side area or the front side area before the housing is tilted is allowed to image a ground or a sky (for example, the ground or the sky that is lateral to the vehicle) after the housing is tilted. As a result, the displaying device (or the display, the same applies to the below described description about the additional statement) is allowed to display the ground or the sky. Here, the occupant of the vehicle is able to distinguish the image that is obtained by imaging the ground or the sky from the image that is obtained by imaging the rear side area or the front side area at first glance, relatively easily. In this case, even if the occupant of the vehicle does not become aware that the housing is tilted, there is less possibility that the occupant of the vehicle misunderstands that the image displayed on the displaying device is the image showing the rear side area or the front side area. Therefore, the image display apparatus according to the additional statement 1 is capable of preventing the occupant who watches the image displayed on the displaying device when the housing is tilted from misunderstanding a surrounding circumstance of the vehicle.

Note that it is difficult for the housing to be tilted to parry the external force applied from the front side or the rear side if the rotational axis of the housing is perpendicular to the yaw axis. However, the rotational axis of the housing is inclined to the yaw axis in the additional statement 1, and thus, the housing is allowed to be tilted to appropriately parry the external force applied from the front side or the rear side.

(5-2) Additional Statement 2

An image display apparatus according to the additional statement 2 is the image display apparatus according to the additional statement 1, wherein a state of the housing is changed from a first state to a second state by rotating the housing around the predetermined rotational axis, the first state being an state in which the imaging device is allowed to image the rear side area or the front side area of the vehicle, the second state being an state in which the imaging device is allowed to image a ground or a sky.

Alternatively, an image display apparatus according to the additional statement 2 may be the image display apparatus according to the additional statement 1, wherein a state of the housing is changed from a first state to a second state by rotating the housing around the predetermined rotational axis, the first state being an state in which the imager is allowed to image the rear side area or the front side area of the vehicle, the second state being an state in which the imager is allowed to image a ground or a sky.

In the image display apparatus according to the additional statement 2, the imaging device that has imaged the rear side area or the front side area before the housing is tilted is surely allowed to image the ground or the sky after the housing is tilted. Therefore, the image display apparatus according to the additional statement 2 is capable of preventing, more appropriately, an occupant who watches the image displayed on the displaying device when the housing is tilted from misunderstanding the surrounding circumstance of the vehicle.

(5-3) Additional Statement 3

An image display apparatus according to the additional statement 3 is the image display apparatus according to the additional statement 2, wherein the second state is a state in which the imaging device is allowed to image the ground or the sky and is not allowed to image a border between the ground and the sky or between the ground and a structural object on the ground.

Alternatively, an image display apparatus according to the additional statement 3 may be the image display apparatus according to the additional statement 2, wherein the second state is a state in which the imager is allowed to image the ground or the sky and is not allowed to image a border between the ground and the sky or between the ground and a structural object on the ground.

If the imaging device images the rear side area or the front side area when the housing is not tilted, the imaging device usually images the border between the ground and the sky or between the ground and the structural object on the ground (for example, images a reference line corresponding to a horizon line). Therefore, if the imaging device is in a state in which the imaging device is allowed to image the border between the ground and the sky or between the ground and the structural object on the ground after the housing is tilted, there is relatively high possibility that the occupant of the vehicle who does not become aware that the housing is tilted misunderstands that the image displayed on the displaying device is the image showing the rear side area or the front side area. However, in the image display apparatus according to the additional statement 3, the imaging device is in a state in which the imaging device is not allowed to image the border between the ground and the sky or between the ground and the structural object on the ground after the housing is tilted. Thus, even if the occupant of the vehicle does not become aware that the housing is tilted, there is less possibility that the occupant misunderstands that the image displayed on the displaying device is the image showing the rear side area or the front side area. Therefore, the image display apparatus according to the additional statement 3 is capable of appropriately preventing an occupant who watches the image displayed on the displaying device when the housing is tilted from misunderstanding the surrounding circumstance of the vehicle.

(5-4) Additional Statement 4

An image display apparatus according to the additional statement 4 is the image display apparatus according to the additional statement 2 or 3, wherein the displaying device is configured to execute an alert operation for showing that the housing is in the second state, if the housing is in the second state.

Alternatively, an image display apparatus according to the additional statement 4 may be the image display apparatus according to the additional statement 2 or 3, wherein the display is configured to execute an alert operation for showing that the housing is in the second state, if the housing is in the second state.

The image display apparatus according to the additional statement 4 allows the displaying device for displaying the external image to execute the alert operation, if the housing is in the second state. Thus, when the housing is in the second state, the occupant can understand that the displaying device does not display the image showing the rear side area or the front side area that is expected to be imaged by the imaging device. In other words, when the housing is in the second state, the occupant does not misunderstand that the displaying device displays the image showing the rear side area or the front side area that is expected to be imaged by the imaging device. Thus, the image display apparatus according to the additional statement 4 is capable of preventing, more appropriately, the occupant who watches the external image displayed on the displaying device when the housing is in the second state from misunderstanding the surrounding circumstance of the vehicle.

(5-5) Additional Statement 5

An image display apparatus according to the additional statement 5 is an image display apparatus having: an imaging device that is placed at a tiltable housing so that the imaging device is allowed to image a rear side area or a front side area of a vehicle when the housing is in a first state; and a displaying device that is configured to display an external image captured by the imaging device, wherein the displaying device is configured to execute an alert operation for showing that the housing is in a second state that is different from the first state, if the housing is tilted to be in the second state.

Alternatively, an image display apparatus according to the additional statement 5 may be an image display apparatus having: an imager that is placed at a tiltable housing so that the imager is allowed to image a rear side area or a front side area of a vehicle when the housing is in a first state; and a display that is configured to display an external image captured by the imager, wherein the display is configured to execute an alert operation for showing that the housing is in a second state that is different from the first state, if the housing is tilted to be in the second state.

The image display apparatus according to the additional statement 5 allows the displaying device for displaying the external image to execute the alert operation, if the housing is tilted to be in the second state. Thus, when the housing is in the second state, the occupant can understand that the displaying device does not display the image showing the rear side area or the front side area that is expected to be imaged by the imaging device. In other words, when the housing is in the second state, the occupant does not misunderstand that the displaying device displays the image showing the rear side area or the front side area that is expected to be imaged by the imaging device. Thus, the image display apparatus according to the additional statement 5 is capable of preventing the occupant who watches the external image displayed on the displaying device when the housing is in the second state from misunderstanding the surrounding circumstance of the vehicle.

(5-6) Additional Statement 6

An image display apparatus according to the additional statement 6 is the image display apparatus according to the additional statement 4 or 5, wherein the alert operation includes a first operation for displaying an alert image for alerting an occupant of the vehicle that the housing is in the second state while keeping displaying the external image.

In the image display apparatus according to the additional statement 6, the occupant who watches the alert image does not misunderstand that the external image displayed on the displaying device is the image showing the rear side area or the front side area that is expected to be imaged by the imaging device.

(5-7) Additional Statement 7

An image display apparatus according to the additional statement 7 is the image display apparatus according to the additional statement 4 or 5, wherein the alert operation includes a second operation for displaying an alert image for alerting an occupant of the vehicle that the housing is in the second state without displaying the external image.

In the image display apparatus according to the additional statement 7, when the hosing is in the second state, the occupant does not misunderstand that the displaying device displays the image showing the rear side area or the front side area that is expected to be imaged by the imaging device, because the displaying device does not display the external image. Moreover, since the displaying device displays the alert image, the occupant appropriately understands that the housing is in the second state (namely, the housing is tilted) without misunderstanding that the external image is not displayed due to a trouble of the displaying device.

(5-8) Additional Statement 8

An image display apparatus according to the additional statement 8 is the image display apparatus according to any one of the additional statements 4 to 7, wherein the image display apparatus further comprises a detecting device that is configured to detect whether or not the housing is in the second state, the displaying device is configured to execute the alert operation on the basis of a detection result of the detecting device.

Alternatively, an image display apparatus according to the additional statement 8 may be the image display apparatus according to any one of the additional statements 4 to 7, wherein the image display apparatus further comprises a detector that is configured to detect whether or not the housing is in the second state, the display is configured to execute the alert operation on the basis of a detection result of the detector.

In the image display apparatus according to the additional statement 8, the state of the housing is surely and easily detected on the basis of the detection result of the detecting device (or the detector, the same applies to the below described description about the additional statement). Therefore, the displaying device is capable of executing the alert operation at a desired timing (namely, a timing at which the housing is in the second state) on the basis of the detection result of the detecting device.

At least one portion of the feature in the above described embodiment may be eliminated or modified accordingly. At least one portion of the feature in the above described embodiments may be combined with another one of the above described embodiments.

This application is based upon and claims the benefit of priority of the prior Japanese Patent Application No. 2017-194309, filed on Oct. 4, 2017, the entire contents of which are incorporated herein by reference. In addition, the entire contents of the above described Patent Literatures 1 to 3 are incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. An image display apparatus, which involve such changes, are also intended to be within the technical scope of the present invention.

REFERENCE SIGNS LIST 1, 2 vehicle
11L left camera
11R right camera
13, 23 ECU
131 image obtaining unit
132 display controlling unit
233 alert controlling unit
14 display
15L, 15R camera housing
16L left door
16R right door
22 state sensor
BL_area left side rear area
BR_area right side rear area
FL_area left side front area
FR_area right side front area
θL, θR rotational axis

The invention claimed is:

1. An image display apparatus comprising:
a tiltable housing that is located on a side of a vehicle and that is allowed to rotate around a predetermined rotational axis that is along a direction inclined to a yaw axis of the vehicle;
an imager that is placed at the housing and a view field that is changed by rotating the housing around the predetermined rotational axis; and
a display that is configured to display an external image captured by the imager, wherein
the housing has a plane on which a lens of the imager is located, and
the plane facing to a rear side or a front side of the vehicle is tilted to a ground side or a sky side by rotating the housing around the predetermined rotational axis.

2. The image display apparatus according to claim 1, wherein
the imager is allowed to image a rear side area or a front side area of the vehicle when the plane faces to the rear side or the front side, and
the imager is allowed to image a ground or a sky when the plane is tilted to the ground side or the sky side.

3. The image display apparatus according to claim 2, wherein
the imager is allowed to image the ground or the sky and is not allowed to image a border between the ground and the sky or between the ground and a structural object on the ground.

4. The image display apparatus according to claim 1, wherein
- a detector that is configured to detect whether or not the plane is tilted to the ground side or the sky side, and
- the display being configured to execute an alert operation for showing that the plane is tilted, if it is detected that the plane is tilted to the ground side or the sky side by the detector.

5. The image display apparatus according to claim 4, wherein
- the alert operation includes a first operation for displaying an alert image for alerting an occupant of the vehicle that the plane is tilted while keeping displaying the external image.

6. The image display apparatus according to claim 4, wherein
- the alert operation includes a second operation for displaying an alert image for alerting an occupant of the vehicle that the plane is tilted without displaying the external image.

* * * * *